UNITED STATES PATENT OFFICE.

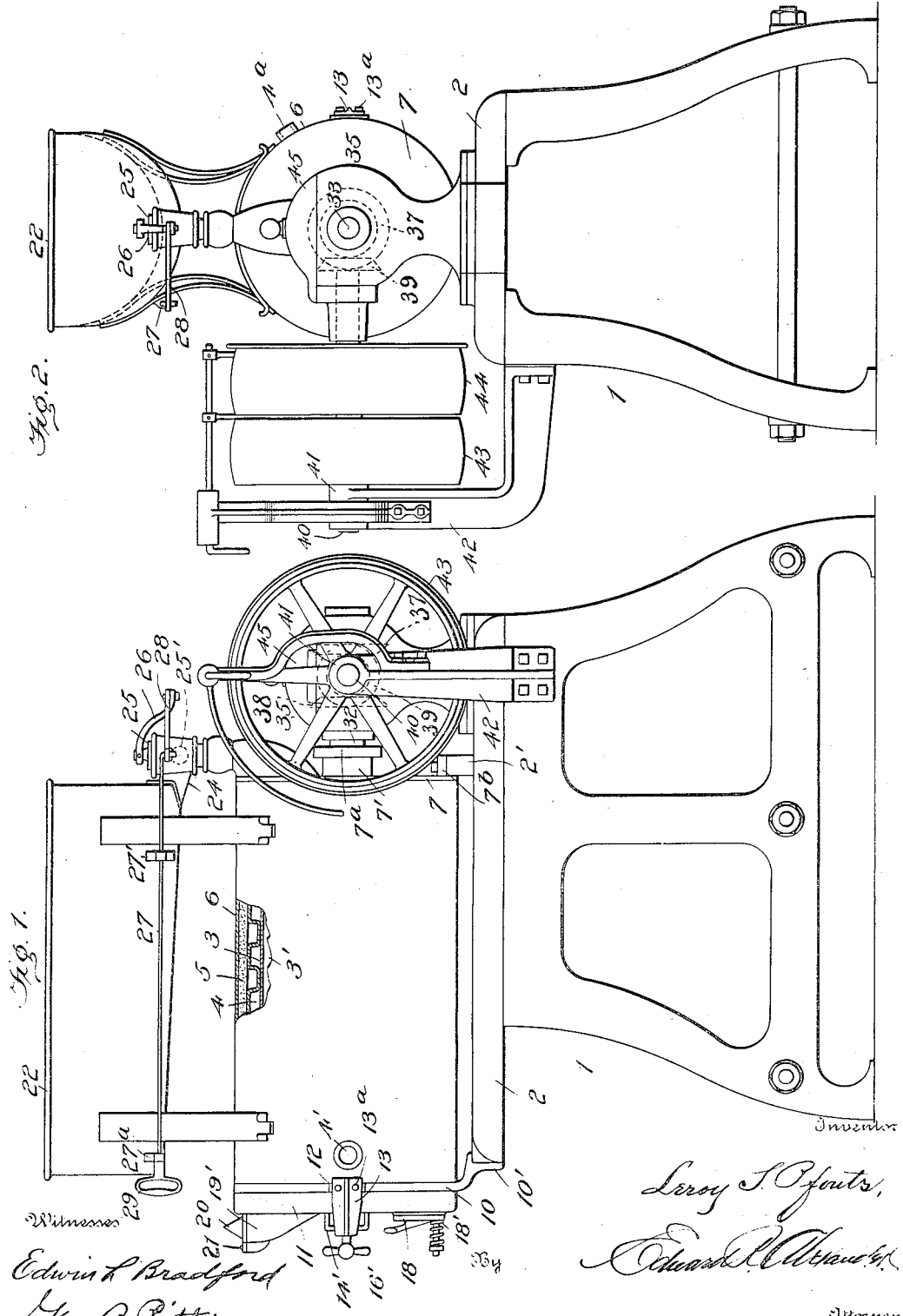

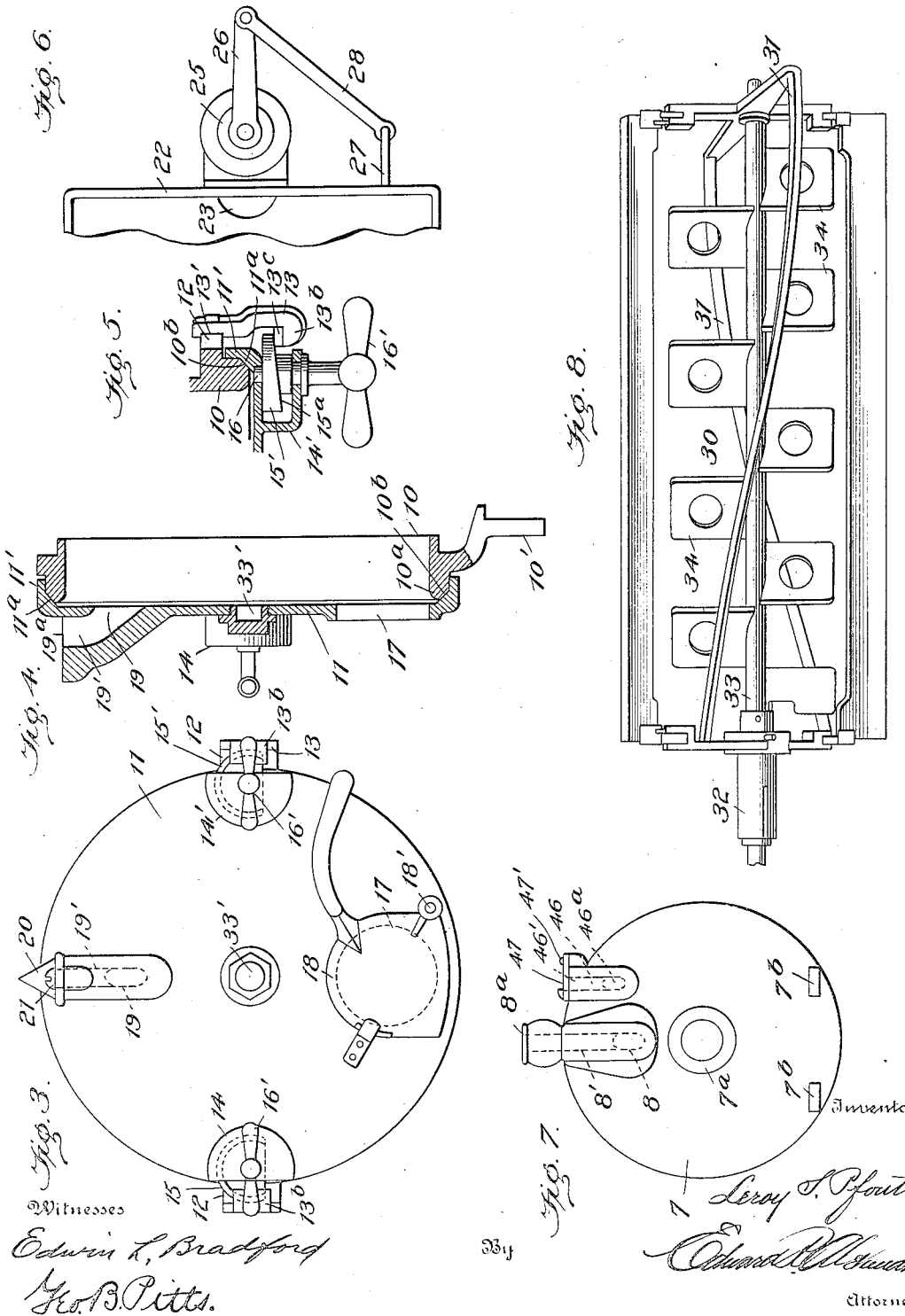

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

ICE-CREAM FREEZER.

990,496. Specification of Letters Patent. Patented Apr. 25, 1911.

Application filed June 4, 1907. Serial No. 377,237.

*To all whom it may concern:*

Be it known that I, LEROY S. PFOUTS, a citizen of the United States, residing at Canton, in the county of Stark and State of Ohio, have invented certain new and useful Improvements in Ice-Cream Freezers, of which the following is a specification, reference being had therein to the accompanying drawings.

This invention relates to improvements in ice cream freezers.

It pertains particularly to that class of freezers in which the freezing cylinder is arranged horizontally, is cooled by brine, and is provided with agitating mechanism having an element adapted to discharge or eject the mixture treated through a discharge opening at one end of the cylinder.

Figure 1 is a side elevation of an ice cream freezer embodying my improvements. Fig. 2 is a rear end view of the same. Fig. 3 is a front view of the discharge end of the cylinder. Fig. 4 is a central vertical section of the discharge end of the cylinder. Fig. 5 is a plan view of the means for holding the head at the discharge end of the cylinder in engagement therewith, part of the head and cylinder being shown in section. Fig. 6 shows details of the valve-operating connection. Fig. 7 illustrates a different construction of head for the rear end of the freezer from the construction illustrated in Figs. 1 and 2. Fig. 8 is a perspective view of the whipping, beating, agitating and propelling mechanism.

In the drawings, 1 indicates as an entirety a table or platform constructed of any suitable material, having a horizontally disposed top plate 2 upon which a freezing cylinder 3 is held in a horizontal position. 3' indicates the freezing chamber within said cylinder.

4 represents as an entirety a helical passageway for brine surrounding the freezing cylinder 3, 5 a suitable insulating material surrounding said brine coil, and 6 an exterior metal jacket. For the purpose of simplifying the description hereafter, the cylinder 3 and the jackets surrounding it, as an entirety, are referred to as the freezing cylinder of the apparatus. The inlet and outlet ports for the brine-circulating coil or passage may be arranged as desired; in the drawing 4' indicates the brine inlet and 4ª the brine outlet.

7 is a head for the rear end of the freezing cylinder. At its center it has a rearwardly extending hollow boss 7' carrying a stuffing box 7ª. 8 is an inlet opening through the said head, preferably arranged above the center thereof, and having a duct 8' leading upwardly from it through a projection 9 carried by the said head, and preferably formed integral with it. This inlet duct 8' terminates at its upper end in a horizontally disposed port 8ª. The head 7 may be supported upon the frame 1 in any suitable manner. In the construction shown in the drawings 7ᵇ, 7ᵇ, are horizontally disposed rearwardly extending lugs carried by the head and detachably secured to a laterally extending rib 2' carried by the top plate 2 of the frame.

At its front end the freezing cylinder 3 has secured to it a ring or annular member of metal 10 having a downward extension 10', which, at its lower end, is detachably secured to the front end of the top plate 2 of the frame. This ring 10 has a forward annular extension 10ª, the front end of which is beveled as indicated at 10ᵇ.

11 indicates as an entirety the front end or head for the freezing cylinder. It carries a rearwardly extending annular flange or collar 11', provided with a beveled annular seat 11ª adapted to engage with the beveled edge 10ᵇ on the ring 10 to form a fluid tight joint. The ring 10 carries at either side laterally projecting lugs 12.

13, 13, are brackets or cam catches recessed at 13' to receive the adjacent lug 12. 13ª are screws or bolts detachably securing said brackets to said lugs. The front end of each bracket or cam catch is turned inwardly toward the axis of the cylinder as indicated at 13ᵇ and these inwardly turned extensions carry rearwardly extending lugs 13ᶜ.

14, 14', are pockets, carried by the head 11, preferably two in number, one arranged at either side of said head. The walls of said pockets are preferably formed integrally with the head. 15, 15', are cams arranged in said pockets 14, 14', respectively. The outermost wall 15ª of each of these cams is adapted to engage with the lug 13ᶜ on the adjacent cam catch 13. Each of these cams is rigidly secured to a shaft 16, suitably mounted at its rear end in the adjacent wall of the head 11, extending through said cam and through a suitable opening in the front wall of the pocket in which the cam is mounted, and carrying at its front end an operating handle 16'. The distance of each cam face 15ª from the rear wall of the pocket containing said cam, increases gradually from the outer end of the cam inwardly, so that as the cam is rotated against the adjacent lug 13ᶜ, the beveled seat 11ª on head 11 is forced tightly against the coöperating beveled surface 10ᵇ on the ring 10.

17 is an outlet duct extending through the head 11 near the bottom thereof, in line with the bottom of the freezing chamber 3'. 18 is a gate or valve for controlling said discharge opening. It is suitably mounted on the head 11, preferably by means of a pivot 18'.

19 is a vent opening or air escape for the freezing chamber 3', preferably extending through the head 11 near the top thereof, and communicating with an upwardly extending duct 19' the walls of which, if desired, may be formed integrally with the head 11.

19ª is a horizontally disposed port at the upper end of the duct 19'.

20 is a cap pivoted at 21 to the front wall of the duct 19, and adapted to completely close port 19ª.

22 is a batch or mixture receptacle, or tank, of any desired kind, suitably mounted upon the jacket 6 of the freezing cylinder, or otherwise supported above the freezing cylinder. At its lower rear corner it has a discharge opening 23, communicating with a duct 24. The flow of mixture through this duct 24 into the inlet 8' may be controlled by any suitable valve mechanism. I have shown arranged in said duct 24 a rotary hollow valve 25, the lower end of which is inserted in the upper end of the inlet duct 8' for the freezing cylinder. 25' is a port through the wall of said valve.

26 is an arm or lever having one end secured to the upper end of the valve 25.

27 is a rod extending longitudinally at one side of the tank 22 and mounted loosely in suitable bearings 27', 27ª carried by said tank, so as to be free to reciprocate longitudinally.

28 is a link pivotally connected at its front end to the rear end of the rod 27, and at its rear end to the outermost end of the lever 26.

29 is a handle at the front end of the rod 27 to facilitate in the operation of said rod.

The material-whipping, beating, agitating and propelling mechanism within the freezing chamber 3' may be of any suitable and well known kind, which, besides being capable of imparting the necessary agitation and whipping of the material to be frozen, also carries an element which will eject the said material through the discharge opening 17 at the front end of the freezing cylinder, when desired. In the drawings, 30 indicates as an entirety such a mechanism, having a longitudinally disposed, spirally twisted blade 31 arranged to operate closely adjacent to the inner wall of the freezing cylinder and suitably connected at one end to a hollow shaft 32 which extends rearwardly through the bearing boss 7' on the rear head 7. 33 is a shaft disposed axially within said freezing chamber, mounted at its front end in a bearing 33' carried by the front head 11, and having its rear end extending through the hollow shaft 32.

34 indicates radially disposed blades or beaters suitably arranged upon the shaft 33.

35 is a gear box secured upon the bed plate 2 near the rear end thereof, and having a chamber 35' in which the driving gears for the inner and outer parts of the dasher mechanism within the freezing chamber are located. The shaft 33 extends through the gear box 35, is mounted in a bearing in the rear end thereof, and has splined to it a bevel gear 37. The shaft 32 extends into the gear box 35 and has splined to it a gear wheel 38, reversely positioned on said shaft 32 to the positioning of the gear 37 on the shaft 33.

39 is a bevel gear meshing with the bevel gears 37 and 38. It is secured to the inner end of a horizontally disposed shaft 40, which extends laterally through a bearing in the gear box 35 and has its outer end mounted in a bearing 41 carried by an upwardly extending arm 42, which is rigidly secured at its lower end to frame 1.

43 and 44 are belt pulleys, the former mounted loosely upon and the latter rigidly secured to the drive shaft 40.

45 is a suitable cover for the gear box 35.

In order to fill the freezing cylinder with the mixture to be treated, the same having been first poured into the receiving tank 22, the operator standing at the front end of the machine turns the cap 20 to establish communication through the vent 19 between the interior of the freezing chamber 3 and the outside air, it being understood that the discharge port 17 is closed by the discharge valve 18 at this time. He then grasps the handle 29 on the rod 27 and pulls it forward, thereby opening the valve 25 and permitting the mixture in the tank 22 to flow downward under the action of gravity into the freezing chamber 3'. Heretofore, none of the horizontal ice cream freezers of which I am aware have been provided with a suitable vent supplemental to the material inlet and discharge openings to prevent backward rush or pressure of the air in the freezing chamber through the inlet opening therein.

In fact, considerable difficulty has been experienced in endeavoring to rapidly fill horizontal freezing chambers in this class of apparatus because of the back rush of air from the freezing chamber at the time when the mixture was being directed into it. With my improved construction, by providing a vent for the freezing chamber in the manner herein described, I have avoided all the difficulties heretofore incident to the rapid filling of the freezing chamber with the mixture to be treated.

While in the drawings I have shown the vent at the front end of the freezing cylinder, it will be understood, it may be applied elsewhere along the top of the cylinder, front or rear, as desired.

The mechanism for permitting the control, from the front end of the cylinder, of the valve controlling the introduction of mixture to the rear end thereof, is of particular value in the rapid operation of a freezer of the type herein shown, as it precludes the necessity of reaching to the rear of the freezing cylinder in order to control said valve.

In the modification of rear end or head for a freezer of the type herein shown, illustrated in Fig. 7, the only change in construction over the rear head 7 above described, is in the addition of an inlet duct for fruit, or other substance, which it may be desired to introduce into the freezing cylinder at any time during the operation of the freezer upon a batch of material in the freezing chamber. 46 indicates such a duct, the walls of which are preferably formed integrally with the head 7. This duct has a horizontally disposed port 46' to receive the fruit or other substance, and a duct 46ª leading into the freezing chamber 3'. 47 is a cover or cap for the port 46', it being pivotally connected at 47' to a wall of duct 46.

The beveled annular engaging surfaces between the front head 11 and the cylinder ring 10 are capable of being readily ground to insure a liquid tight joint, this construction affording a very simple and perfect closure for the front end of the freezing cylinder.

The gear case 35 may be filled with a suitable amount of lubricant, insuring that the gears in the case will be thoroughly lubricated.

Where a rear freezer head of the construction shown in Fig. 7 is employed, the vent 19 in the front head of the cylinder may be dispensed with, as the duct 46ª and gate 47 will perform the same functions as the duct 19' and cap 20.

What I claim is:—

1. In an ice cream freezer, the combination of a horizontally disposed freezing cylinder, a head at the rear end thereof formed with an inlet opening a head at the opposite end thereof formed with a discharge opening, near the bottom of the head, a feed duct communicating at one end with said inlet opening for the freezing cylinder, a valve to control the flow of material through said duct, and means for actuating said valve, operable from the front end of said freezing cylinder.

2. In an ice cream freezer, the combination of a horizontally disposed freezing cylinder, a head at the rear end thereof formed with an inlet opening, a head at the opposite end thereof formed with a discharge opening near the bottom of the head, a valve to control said discharge opening, a filling receptacle arranged above said freezing cylinder, a duct communicating at one end with said receptacle, and at its other end with said inlet opening for the freezing cylinder, a valve to control the flow of material through said duct, means for actuating said valve, operable from the front end of said freezing cylinder, and a dasher in said freezing cylinder.

3. In an ice cream freezer, the combination of a horizontally disposed freezing cylinder, a head at the rear end thereof formed with an inlet opening, a head at the opposite end thereof formed with a discharge opening near the bottom of the head, a valve to control said discharge opening, a filling receptacle arranged above said freezing cylinder, a duct communicating at one end with said receptacle, and at its other end with said inlet opening for the freezing cylinder, a valve to control the flow of material through said duct, means for operating said valve including a hand operable device located at the front end of said freezing cylinder, and suitable connection between said device and said valve.

4. In an ice cream freezer, the combination of a horizontally disposed freezing cylinder, a head at the rear end thereof formed with an inlet opening, a head at the opposite end thereof formed with a discharge opening near the bottom of the head, a valve to control said discharge opening, a filling receptacle arranged above said freezing cylinder, a duct communicating at one end with said receptacle, and at its other end with said inlet opening for the freezing cylinder, a valve to control the flow of material through said duct, and a reciprocatable rod suitably connected at its rear end to said valve and having its front end arranged at the front end of said freezing cylinder.

5. In an ice cream freezer, the combination of a freezing cylinder having a beveled annular surface at the front end thereof, a head for the rear end of said cylinder suitably secured thereto, and a head detachably mounted on the front end of said freezing cylinder and having a beveled annular seat adapted to engage said beveled annular surface at the front end of the freezing cylinder, and means for holding said head with its annular seat against the said annular surface at the front end of the freezing cylinder.

6. In an ice cream freezer, the combination of a freezing cylinder, a head for one end thereof having a discharge opening through it in line with the inner wall of the cylinder, a valve to control said discharge opening, a head for the other end of the cylinder having an inlet duct communicating at one end with the interior of the cylinder and having its other end arranged to communicate with a source of liquid supply, and a supplemental inlet duct also having one of its ends communicating with the interior of the cylinder, and its opposite end disposed to receive substances to be introduced into the mixture being treated in the cylinder, during the freezing thereof, a gate for controlling the outer end of said supplemental duct, and a dasher in said cylinder.

In testimony whereof I affix my signature, in presence of two witnesses.

LEROY S. PFOUTS.

Witnesses:
C. C. WRIGHT,
GEO. B. PITTS.